(12) United States Patent
Esteveny et al.

(10) Patent No.: US 10,696,854 B2
(45) Date of Patent: Jun. 30, 2020

(54) PHOTOCROSSLINKABLE WRITING INK

(71) Applicant: SOCIETE BIC, Clichy (FR)

(72) Inventors: Nadège Esteveny, Montevrain (FR); Kathy Vuillaume, Serris (FR); Christelle Debrauwer, Saint Germain sur Morin (FR)

(73) Assignee: SOCIETE BIC, Clichy (FR)

( * ) Notice: Subject to any disclaimer, the term of this patent is extended or adjusted under 35 U.S.C. 154(b) by 71 days.

(21) Appl. No.: 15/319,544

(22) PCT Filed: Jun. 12, 2015

(86) PCT No.: PCT/FR2015/051559
§ 371 (c)(1),
(2) Date: Dec. 16, 2016

(87) PCT Pub. No.: WO2015/193590
PCT Pub. Date: Dec. 23, 2015

(65) Prior Publication Data
US 2017/0183521 A1    Jun. 29, 2017

(30) Foreign Application Priority Data
Jun. 16, 2014  (FR) ..................... 14 55495

(51) Int. Cl.
C09D 11/20     (2006.01)
B43K 29/10     (2006.01)
C09D 11/18     (2006.01)
C09D 11/101    (2014.01)
B43K 7/00      (2006.01)
C09D 11/16     (2014.01)
B05D 3/06      (2006.01)
C09D 11/17     (2014.01)

(52) U.S. Cl.
CPC .............. *C09D 11/20* (2013.01); *B05D 3/067* (2013.01); *B43K 7/00* (2013.01); *B43K 29/10* (2013.01); *C09D 11/101* (2013.01); *C09D 11/16* (2013.01); *C09D 11/17* (2013.01); *C09D 11/18* (2013.01)

(58) Field of Classification Search
CPC ....... C09D 11/20; C09D 11/101; C09D 11/16; C09D 11/17; C09D 11/18; B05D 3/067; B43K 7/00; B43K 29/10
See application file for complete search history.

(56) References Cited

U.S. PATENT DOCUMENTS

| | | | | |
|---|---|---|---|---|
| 4,336,377 A * | 6/1982 | Adam | ................... | C09B 69/001 544/75 |
| 2009/0176906 A1 * | 7/2009 | Ilg | .......................... | C07B 63/04 522/75 |

FOREIGN PATENT DOCUMENTS

| | | |
|---|---|---|
| WO | 2006/111494 A1 | 10/2006 |
| WO | 2008/009987 A1 | 1/2008 |
| WO | 2008/093071 A1 | 8/2008 |
| WO | 2010/078735 A1 | 7/2010 |

OTHER PUBLICATIONS

International Search Report dated Aug. 4, 2015 from corresponding International Application No. PCT/FR2015/051559, 7 pages.
Written Opinion dated Aug. 4, 2015 from corresponding International Application No. PCT/FR2015/051559, 6 pages.
Dong et al., "Pen and Ink Material Chemistry", Science Press, Mar. 2005, pp. 52-53 and 106 (partial translatation).
Zhang et al., "Practical Coloring and Color Matching Technology", Chemical Industry Press, Sep. 2001, pp. 575-576 and 579 (partial translation).
Chinese Office Action dated Jul. 16, 2019 in corresponding Chinese Patent Application No. 201580031844.5, 13 pages.

* cited by examiner

*Primary Examiner* — Robert S Walters, Jr.
(74) *Attorney, Agent, or Firm* — Ohlandt, Greeley, Ruggiero & Perle, L.L.P.

(57) ABSTRACT

The disclosure relates to a solvent-free photocrosslinkable writing ink advantageously for a pen, including, as a percentage by weight relative to the total weight of the ink: a—between 40 and 75% of a photocrosslinkable acrylate and/or methacrylate oligomer, b—between 1 and 55%, optionally, of a photocrosslinkable acrylate and/or methacrylate monomer, c—between 0.5 and 6% of a photoinitiator, d—between 1 and 10% of a dye, advantageously a basic dye, and e—between 0 and 10% of an additive. The present disclosure further relates to a method for securing a writing medium using the ink, the crosslinked ink obtained by crosslinking the ink and a pen for photocrosslinkable ink including the ink.

20 Claims, No Drawings

PHOTOCROSSLINKABLE WRITING INK

BACKGROUND OF THE DISCLOSURE

1. Field of the Disclosure

The present invention relates to the field of photocrosslinkable writing inks intended to be used as a security ink.

A pigment-based ink can be used as a security ink, i.e. an ink that cannot be erased and thus cannot be forged. This is because pigments are, by definition, insoluble in solvents. Thus, when deposited on a sheet of paper (by means of a writing instrument), they infiltrate into the fibers of the paper, by means of the binder, and remain "trapped" therein. It is thus very difficult to dislodge them therefrom, even by means of solvents in which the paper on which the deposit has been made has been soaked.

However, some of these inks can be removed from the paper by abrasion or friction and are thus not always permanent.

Furthermore, since the pigments are in dispersion in the medium under consideration, the work carried out upstream to formulate the ink is more complex than in the case of a dye-based ink. Indeed, the dispersion requires the homogenous milling of the pigments and the obtaining of particles having a size of less than one micron in order to obtain a homogeneous dispersion (without deposit or segregation). In addition, since the application envisaged is that of a writing ink, the size of the pigments must not be greater than the size of the channels of the writing tip, so as not to block them, which would otherwise inevitably lead to the writing being irreversibly stopped. Furthermore, in addition to the stabilization during the dispersion phase (absence of deposit or of segregation), a long-term (>3 years) stabilization is required for this application.

Conversely, an ink containing dyes is very easy to formulate: the dyes are soluble in the medium, and if there are no additional additives in solid form, the problems previously mentioned for pigment-based inks will not be encountered.

On the other hand, dyes pose the following problems: firstly, they have a weak resistant to light (in certain cases), but especially, after drying of the deposits on the paper, they can be re-dissolved by simply soaking the mark deposited on the paper in the appropriate solvent. Furthermore, in addition to the fact of dissolving these dyes, some very aggressive solvents break the chromophore bonds, thus destroying the color. Thus, it is possible to completely remove the line and, under these conditions, a dye-based ink cannot be used to make a security ink therefrom.

The inventors have surprisingly noticed that it is possible to use dye-based inks as a security writing ink by trapping the dyes after deposit on the paper by means of a chemical reaction, photocrosslinking, which traps the dyes in a network resistant to the conventional panel of solvents (standardized by the Laboratoire National de métrologie et des Essais (LNE) [French National Laboratory for metrology and tests] on the basis of standard ISO 12757-2), which makes it possible to give the ink an indelible nature.

In particular, the inventors have discovered that it is possible to use photocrosslinkable inks in writing instruments. This type of ink has the advantage of rapidly crosslinking, thereby making it possible to rapidly confer on the ink its security ink nature. Indeed, after application of the ink to the paper, it is irradiated by a UV or visible source which causes crosslinking of the ink. The dyes are therefore trapped inside the chemical network formed within the paper fibers themselves. This very rapid reaction makes it possible to "protect" the dyes, and thus the ink line formed cannot become erased (without damaging the paper), whatever the solvent used. Furthermore, it also does not become erased by mechanical action (friction).

In addition, the inventors have been able to formulate these inks without solvent, which makes it possible to avoid all the ecological problems encountered with organic solvents and all the slow-drying problems encountered with aqueous solvents.

2. Description of the Related Art

Photocrosslinkable printing inks are known from applications WO 2008/093071 and WO 2008/009987. However, these inks are not usable in writing instruments of ballpoint pen type, in particular ballpoint pens with a flow rate of between 10 and 300 mg/200 m.

Indeed, for example in the context of application WO 2008/093071, the ink described is an inkjet printing ink of which the viscosity must be less than 100 mPa·s at 25° C. and the temperature at which it is used is generally 40° C. Such a viscosity makes it unsuitable for use in ballpoint pens: it is too fluid and the ink would leak via the point of the pen. In addition, the UV power to be applied in order to obtain efficient crosslinking is very high (use of 2X80W/cm lamps), which is not compatible with consumer safety for writing instruments. In the context of application WO 2008/009987, the printing inks described are "screen printing" inks. They are inks which have a very high viscosity, of between 20 and 80 Pa·s at 25° C. However, viscosities above 30 Pa·s are not easy to use in the context of ballpoint pens since they require specific writing systems with pressurization of the cartridge. Moreover, in application WO 2008/009987, the pigment content is very high (between 20% and 60% by weight and even preferably between 40% and 50% by weight). Such an amount of pigment is impossible to use in a ballpoint pen ink since the viscosity obtained would be too high and there would be a high risk of decanting and of blocking of the point by the pigments.

Application WO 2006/111494 describes a photocrosslinkable ink, optionally usable in ballpoint pens. However, no example of producing an ink for a ballpoint pen is present in said document. The production examples relate instead to the printing inks of which the viscosity is not suitable for use in pens, in particular ballpoint pens. In addition, this ink recommends the presence of a stabilizer consisting of a mixture of sterically hindered nitroxyl radical and of quinone methide. Finally, said document does not specify whether the ink described is a solvent-free ink.

SUMMARY OF THE DISCLOSURE

As it happens, the inventors have noticed that it is possible to obtain a formulation of photocrosslinkable writing ink, usable in particular in pens, more particularly ballpoint pens, using very specific amounts of each of the ingredients.

The present invention thus relates to a solvent-free photocrosslinkable writing ink, advantageously for a pen, more particularly for a ballpoint pen, comprising, as percentage by weight relative to the total weight of the ink:

a—between 40% and 75% of a photocrosslinkable acrylate and/or methacrylate oligomer, b—between 1% and 55% of a photocrosslinkable acrylate and/or methacrylate monomer, c—between 0.5% and 6% of a photoinitiator, d—between 1% and 10% of a dye, advantageously a basic dye, and e—between 0 and 10% of an additive.

DETAILED DESCRIPTION OF THE DISCLOSURE

For the purposes of the present invention, the term "writing ink" is intended to mean any ink which is intended to be used in a writing instrument. A writing ink should not be confused with a printing ink which is used in printing machines and which does not correspond to the same technical constraints and thus to the same specifications. Indeed, a writing ink must not contain solid particles of which the size is greater than the channels of the writing instrument, in order to avoid blocking them, which would inevitably lead to writing being irreversibly stopped. In addition, a writing ink must not be too fluid, so as to avoid leaks during writing. However, it must be sufficiently fluid to facilitate the flow of the writing action. For example:

- for ballpoint pens, the ink must generally have a viscosity at 20° C. of between 10 000-20 000 mPa·s, more particularly less than 20 000 mPa·s, or in the case of low-viscosity inks, between 500 and 5000 mPa·s (viscosity measured at 20° C. with the Thermo Haake RS1 rheometer with a C35-1° spindle, step at 100 $s^{-1}$ for 2 min).
- for gel ink pens, the viscosity, measured at rest at 20° C., is approximately 30 000 mPa·s and measured with a rate of 100 $s^{-1}$, is less than 500 mPa·s at approximately 5000 $s^{-1}$ (the viscosity measurement is carried out with the Thermo Haake RS1 rheometer with a C60-1° spindle, ramp of 0 to 1 $s^{-1}$ for 30 seconds then step at 1 $s^{-1}$ for 1 min, then ramp of 1 $s^{-1}$ to 5000 $s^{-1}$ for 1 min, then step at 5000 $s^{-1}$ for 30 s);
- for roller pens, the viscosity measured at 20° C. is less than approximately 50 mPa·s (the viscosity measurement was carried out at 100 $s^{-1}$ with the Brookfield viscometer with a ULA spindle and a 16 ml container).

In addition, it must allow an ink flow rate suitable for the writing instrument used, in particular a flow rate of between 10 and 300 mg/200 m of writing, advantageously between 15 and 20 mg/150 m of writing. It must also dry sufficiently rapidly to avoid smudging the writing medium. It must also avoid the problems of migration (bleeding) over time. Thus, the ink according to the present invention will be suitable for the writing instrument for which it is intended.

The writing instrument may thus be a pen, a felt-tip pen with a fine, medium or broad tip, a marker or a highlighter. It is advantageously a pen, in particular chosen from ballpoint pens, roller pens and gel ink pens, more particularly it is a ballpoint pen.

For the purposes of the present invention, the term "solvent-free ink" is intended to mean any ink which contains no aqueous or organic solvent, even in a small proportion. This is because some of its constituents are sufficiently liquid to make the use of solvents needless.

For the purposes of the present invention, the term "photocrosslinkable ink" is intended to mean any ink which crosslinks via the action of UV radiation or of visible light, advantageously UV radiation, in particular UV-A radiation. The source of UV or visible irradiation which enables the crosslinking of these inks can emit a monodisperse or polydisperse wavelength, in particular a monodisperse wavelength, advantageously chosen from the range of between 230 and 410 nm, such as, for example, 232, 240, 275, 293, 307, 318, 327, 360, 365, 382 and 405. The irradiation source may thus be a monodisperse light-emitting diode (LED) or a polydisperse metal halide lamp, such as, for example, a doped mercury lamp, or both.

For the purposes of the present invention, the term "oligomer" is intended to mean any small polymeric chain advantageously consisting of at least two monomers and more advantageously of at most 20 monomers. In particular, an oligomer has a low molecular weight, generally less than 4000 g/mol.

For the purposes of the present invention, the term "photocrosslinkable acrylate and/or methacrylate oligomer" is intended to mean any oligomer as defined above, having at least one acrylate and/or methacrylate unit and crosslinking by means of a radical reaction under the action of UV radiation or of visible light. Advantageously, the oligomer according to the present invention is chosen from acrylates, methacrylates, aliphatic polyurethane acrylates, aromatic polyurethane acrylates, polyester acrylates, polyether acrylates, polyepoxy acrylates, aliphatic polyurethane methacrylates, aromatic polyurethane methacrylates, polyester methacrylates, polyether methacrylates, polyepoxy methacrylates, and mixtures thereof, advantageously from aromatic polyurethane acrylates, polyester acrylates and aliphatic polyurethane acrylates, even more advantageously from aromatic polyurethane acrylates and aliphatic polyurethane acrylates, in particular from aromatic polyurethane acrylates. Particularly advantageously, the oligomer according to the present invention is a photocrosslinkable acrylate oligomer. The oligomers according to the present invention can have chain-end functionalities ranging from 2 to 16, in particular 6, and a viscosity which can range from 320 to 50 000 mPa·s measured at 20° C., in particular between 1000 and 50 000 mPa·s. The oligomer according to the present invention may for example be a hexaacrylate oligomer, in particular an aromatic polyurethane hexaacrylate or an aliphatic polyurethane hexaacrylate, more particularly an aromatic polyurethane hexaacrylate. These oligomers are commercially available, for example from Sartomer under the trade name CN9196 or CN9110 EU.

The photocrosslinkable ink according to the invention contains (by weight relative to the total weight of the ink) between 40% and 75% of the photocrosslinkable acrylate and/or methacrylate oligomer, advantageously between 41% and 73%, even more advantageously between 60% and 73%, particularly preferably between 69% and 72%. The oligomer content makes it possible in particular to obtain the viscosity suitable for the use of the ink in writing instruments, in particular ballpoint pens. Thus, if the content is less than 40% by weight, the viscosity will not be sufficient.

For the purposes of the present invention, the term "photocrosslinkable acrylate and/or methacrylate monomer" is intended to mean any monomer having at least one acrylate and/or methacrylate unit and crosslinking by means of a radical reaction under the action of UV radiation or of visible light.

Advantageously, the monomer according to the present invention is chosen from monofunctionalized or polyfunctionalized acrylates, monofunctionalized or polyfunctionalized methacrylates and mixtures thereof, advantageously from polyfunctionalized acrylates. It may in particular be an aromatic or aliphatic monomer of (hydroxylated, ethoxylated, propoxylated, alkoxylated) mono-, di-, tri-, tetra-, penta-acrylates and methacrylates, possibly having short polymer chains of polyether, polyurethane, polyester or polyepoxy type, possibly modified with amine groups. These monomers can have chain-end functionalities ranging from 2 to 16 and in particular a viscosity which can range from 6 to 21 600 mPa·s measured at 20° C., in particular from 100 to 500 mPa·s. The monomer according to the present invention may thus be a hyperbranched acrylate polyester or an ethoxylated pentaerythritol tetraacrylate. In particular, it is commercially available from Sartomer under the trade names CN2302 and SR494LM.

The monomer makes it possible to reduce the viscosity of the ink.

The photocrosslinkable ink according to the invention contains (by weight relative to the total weight of the ink) between 1% and 55% of the photocrosslinkable acrylate and/or methacrylate monomer, advantageously between 10% and 50%, advantageously between 10% and 40%, in particular between 10% and 30%, more particularly between 15% and 25%. If the monomer content is greater than 55% by weight, the viscosity will not be sufficient for use of the ink in writing instruments, in particular ballpoint pens.

For the purposes of the present invention, the term "photoinitiator" is intended to mean any product which makes it possible to initiate the reaction for radical crosslinking of the oligomers and of the monomers optionally present in the ink according to the invention during their irradiation by a UV or visible source. Indeed, the photoinitiator, by absorbing the energy of the photons emitted, will become an excited species (in radical form). Thus, this species reacts with the reactive functions of the oligomers and of the optional monomers of the ink, leading to crosslinking of the material. The photoinitiator is thus advantageously a photoinitiator which absorbs in the UV or visible range, more advantageously a photoinitiator which absorbs in the UV-A range. In particular, the photoinitiator according to the present invention will allow surface and/or deep initiating of the radical polymerization reaction. More particularly, the photoinitiator according to the present invention absorbs the emission wavelengths of lamps/LEDs, and/or the wavelengths chosen in the range of between 230 and 410 nm, such as, for example, 232, 240, 275, 293, 307, 318, 327, 360, 365, 382 and 405 nm. In one particular embodiment, the photoinitiator is of type I; advantageously, it is a photoinitiator of acyl phosphine oxide type, more particularly it is ethyl 2,4,6-trimethylbenzoylphenylphosphinate or 2,4,6-trimethylbenzoylphenylphosphinic acid ethyl ester. These photoinitiators are commercially available, for example, from BASF under the trade names Lucirin TPO-L and Irgacure® 2100.

The photocrosslinkable ink according to the invention contains (by weight relative to the total weight of the ink) between 0.5% and 6% of the photoinitiator, advantageously between 4% and 6%, in particular approximately 5%.

The photocrosslinkable ink according to the invention is a dye-based ink. It thus comprises at least one dye, it may also comprise several thereof. The dyes usable in the ink according to the invention may be black, blue, red, green, violet, pink, turquoise, etc. dyes, in particular black or blue dyes, more particularly blue dyes. Advantageously, it does not comprise pigments, and in particular does not comprise titanium oxide. In particular, the dyes usable in the ink according to the present invention are basic dyes. They may for example be dyes belonging to the triarylmethane chemical family, such as, for example, the blue dye sold by BASF under the name Basonyl® 636.

The photocrosslinkable ink according to the invention contains (by weight relative to the total weight of the ink) between 1% and 10% of the dye, advantageously between 3% and 5%, more particularly 4%.

The dye dissolves in the medium consisting of the photocrosslinkable monomers and oligomers according to the present invention. This explains why it is not necessary to add a solvent to the ink according to the present invention.

In one particular embodiment, the ink according to the present invention does not comprise nonethoxylated pentaerythritol acrylate and/or methacrylate and/or itaconate.

The photocrosslinkable ink according to the invention may also comprise an additive. This additive is generally a conventional additive of writing inks. Advantageously, this additive is not in solid form. In one particular embodiment, this additive is chosen from a photosensitizer, a crosslinking accelerator, in particular of the type having a co-synergistic amine group, a lubricant, an initiator additive, an anticorrosion agent, a biocide, a neutralizing agent, a humectant, an anti-drying agent, a resin, a binder, a thickener, a rheology agent, a surfactant, and mixtures thereof.

The photocrosslinkable ink according to the invention may contain (by weight relative to the total weight of the ink) between 0 and 10% of the additive.

Thus, in one particular embodiment, the photocrosslinkable ink according to the present invention comprises, as percentage by weight relative to the total weight of the ink:

a—between 41% and 73% of the photocrosslinkable acrylate and/or methacrylate oligomer, even more advantageously between 60% and 73%, particularly preferably between 69% and 72%;

b—between 10% and 50% of the photocrosslinkable acrylate and/or methacrylate monomer, advantageously between 10% and 40%, in particular between 10% and 30%, more particularly between 15% and 25%;

c—between 4% and 6% of the photoinitiator, in particular approximately d—between 3% and 5% of the dye, more particularly 4%, and e—between 0 and 10% of the additive.

In particular, the ink according to the present invention does not comprise any stabilizer as described in application WO 2006/111494, i.e. any mixture of sterically hindered nitroxyl radical and quinone methide.

This is because the inventors have noticed that, in the context of the ink formulation according to the invention, it is needless to use such a stabilizer since the composition does not show any degradation for example in terms of increase in viscosity (which would imply an untimely beginning of crosslinking) over time, even after aging for 2 months at 40° C. and 80% RH (relative humidity) in the dark, but in the presence of oxygen, which is equivalent to approximately 6 months at 23° C. and 50% RH.

The present invention also relates to a process for making a writing medium secure, characterized in that it comprises the following successive steps:

A. application of the photocrosslinkable ink according to the present invention to a writing medium, advantageously a paper or cardboard medium, in particular using a writing instrument, such as a pen, more particularly a ballpoint pen;

B. irradiation of the ink applied using a UV or visible irradiation source so as to dry the ink and to bring about crosslinking of the photocrosslinkable acrylate and/or methacrylate oligomer, advantageously for a period of between 1 and 10 s with an irradiation dose of 100 mW/cm².

The writing instrument may be as described above for the writing inks. Advantageously, it is a pen, in particular as described above, more particularly a ballpoint pen with a flow rate of between 10 and 300 mg/200 m of writing, advantageously between 15 and 20 mg/150 m of writing.

The UV or visible irradiation source is as described above.

The present invention also relates to the crosslinked ink obtained by crosslinking the photocrosslinkable ink according to the present invention. The crosslinking can be obtained using a UV or visible irradiation source as described above.

Advantageously, the crosslinked ink according to the present invention withstands solvents chosen from dimethylformamide, ethanol, acetone, benzyl alcohol and mixtures thereof. This means that the marks obtained with the crosslinked ink remain perfectly visible and uniform after immersion in one of these solvents, and that they do not fade. It thus cannot be erased by means of these solvents according to standard ISO12757-2. In particular, the solvent resistance test corresponds to that of standard ISO12757-2 which was amended by the Laboratoire National de métrologie et des Essais [French National Laboratory for metrology and tests] (LNE), the procedure of which is the following:

Equipment:
1. Air-conditioned room: 23° C. (±2° C.)/50% RH (±5%)
2. 14 glass bottles with cap Ø 60 mm/height 80 mm.
3. APC or Mikron writing machine with:
   paper ISO 12757
   total weight pen+body+additional weight:
      200 g ballpoint pens—100 g for roller and gel.
   speed 4.5 m/min, spacing 2.2 mm (Mikron: position 8)
4. Reciprocal shaker
5. Timer
6. Absorbent paper Reagents:
1. Distilled or demineralized water
2. 50/50 mixture: 90% ethanol/benzene
3. Saturated sodium sulfite solution
4. Bleach at 12° chlorometric (1 carton of 250 ml at 9.6% ac (active chlorine)+487 ml of water)
5. Hydrochloric acid (solution at 10% by weight of a concentrated solution at d=1.19)
6. Potassium hydroxide: (38.56 g of KOH to be dissolved in 961.4 g of water)
7. Benzyl alcohol
8. 2-Chloroethanol (glycol chlorohydrin)
9. Dimethylformamide
10 a). 1N sulfuric acid (50 g of 98% concentrated in 1 l)
10 b). 1N potassium permanganate (31.6 g of potassium permanganate in 1 l of water)
10 c). 2N sodium bisulfite (9.5 g of sodium metabisulfite in 1 l of water)
11 a). Acetone Procedure: 1. Fill the bottles with the solutions indicated below to a height of approximately 2 cm, and label them.
2. Perform writing of approximately 40 m under the following conditions
   speed 4.5 m/min
   space 2.2 mm (Mikron: position 8)
   writing angle: 70°
3. Cut out 12 test pieces 5 cm long and 4 cm wide while avoiding the beginning and the end of the mark, the irregularities and the spots.
4. For each test, allow the test pieces to stand at 23° C./50% RH according to the time indicated in table 1 below.
5. Keep one test piece as reference.
6. Dip the test pieces in the solutions indicated below. Place the bottles on the reciprocal shaker (speed ~60 rpm) according to the time indicated if the immersion must be carried out with shaking.
7. Remove the marks, then place them on an absorbent paper until they are dry.
8. Attach the various test pieces
9. The marks should remain perfectly visible. A product may be considered "check safe" if each mark remains uniform and perfectly visible after immersion in each solvent.

Table 1 below summarizes the various conditions.

|   |   | Standing time before dipping | Immersion time |
|---|---|---|---|
| 1 | Distilled or demineralized water | A few minutes | 1 H with shaking |
| 2 | 50/50 mixture: 90% ethanol/benzene | | |
| 3 | Saturated sodium sulfite solution | | |
| 4 | Bleach | | |
| 5 | Hydrochloric acid | | |
| 6 | Potassium hydroxide | | |
| 7 | Benzyl alcohol | | |
| 8 | 2-Chloroethanol | | |
| 9 | Dimethylformamide | | |
| 10 | corrector pen<br>a) 1N sulfuric acid<br>b) 1N potassium permanganate<br>c) 2N sodium bisulfite | | 30 seconds in a), then 5 min in b), then until discoloration of the brownish spot in c) with shaking |
| 11 | Washing verification<br>a) Acetone<br>b) Water | 10 min | 5 min in acetone, then 10 min in water without shaking |

Finally, the present invention relates to a pen for photocrosslinkable ink comprising the photocrosslinkable ink according to the present invention.

This pen may also be equipped with a UV or visible irradiation source as defined above, in particular emitting a monodisperse or polydisperse wavelength, more particularly a monodisperse wavelength, chosen from the range of between 232 and 410 nm.

The pen according to the invention can be chosen from ballpoint pens, roller pens and gel ink pens, it is more particularly a ballpoint pen, advantageously with a flow rate of between 10 and 300 mg/200 m of writing, advantageously between 15 and 20 mg/150 m of writing.

The present invention will be understood more clearly in the light of the example which follows, which is given by way of nonlimiting indication.

EXAMPLE 6 photocrosslinkable ink formulations were prepared having the composition indicated in table 2 below, as percentage by weight relative to the total weight of the formulation:

| Formula No. | Oligomer Name | % | Monomer Name | % | Photoinitiator Name | % | Dye (blue) Name | % |
|---|---|---|---|---|---|---|---|---|
| 1 | CN9196 | 71 | CN2302 | 20 | Lucirin TPO-L | 5 | Basonyl 636 | 4 |
| 2 | CN9196 | 71 | SR494LM | 20 | Lucirin TPO-L | 5 | Basonyl 636 | 4 |
| 3 | CN9110EU | 61 | SR494LM | 30 | Lucirin TPO-L | 5 | Basonyl 636 | 4 |
| 4 | CN9110EU | 41 | SR494LM | 50 | Lucirin TPO-L | 5 | Basonyl 636 | 4 |
| 5 | CN9110EU | 61 | SR494LM | 30 | Irgacure 2100 | 5 | Basonyl 636 | 4 |
| 6 | CN9196 | 61 | SR494LM | 30 | Irgacure 2100 | 5 | Basonyl 636 | 4 |

The inks prepared were injected into cartridges of ballpoint pen type (tests with various types of points). Manual and machine writing marks were made in order to observe the quality of the ink (flow rate, shade, defects, etc.).

These same marks were subjected to precise irradiation doses (equivalent to 500-1500 mJ·m$^{-2}$ in UV-A by means of a metal halide lamp) for 10 seconds and then dipped in the solvents judged to be the most "aggressive", namely: benzyl alcohol, dimethylformamide, ethanol and acetone, using the procedure indicated above for the solvent resistance test. When the mark is still present (even if the strength of the color is reduced), this proves that crosslinking has indeed taken place and the ink can be described as indelible.

The following criteria were thus evaluated in order to distinguish the best systems:

Degree of crosslinking of the films on glass plates (degree of conversion at the surface and within the depths of the films), at various thicknesses (25 to 175 μm).

Yellowing of the resins (crosslinking before addition of the dyes).

Absence of tack (revealing incomplete crosslinking, slowed down because of an undesirable surface reaction through contact with atmospheric oxygen, and thus not creating the network optimally), in particular for the samples evaluated on glass plates.

After deposit of the inks reproducibly (writing machines) and irradiation thereof at a dose of 500-1500 micm$^{-2}$ in UV-A by means of a metal halide lamp for 10 seconds, test for resistance to 4 different solvents: benzyl alcohol, dimethylformamide, ethanol and acetone.

Performance levels evaluated as a function of the irradiation source.

Evaluation of the viscosity with a view to a ballpoint pen application, and thus evaluation of the "esthetic" performance levels of each system (in particular, verification of the absence of excessive lateral diffusion in the paper).

Evaluation of the capacity to crosslink and/or to dry in the absence of UV light but under ambient daylight conditions.

Behavior of the polymer resins during aging (evaluation of the hygroscopic capacity and the consequences thereof on the stability of the viscosity over time at 40° C. and 80% relative humidity).

The viscosities of these various inks are collated in table 3 below:

| Formulation No. | Viscosity measured at 20° C. and 100 s$^{-1}$ in mPa · s, with the ThermoHaake RS1 rheometer with a C35-1° spindle, step at 100 s$^{-1}$ for 2 min |
|---|---|
| 1 | 28 310 |
| 2 | 24 910 |
| 3 | 20 913 |
| 4 | 4 080 |
| 5 | 12 915 |
| 6 | 21 385 |

The marks obtained with a ballpoint pen using the above inks proved to be suitable (writing marks without defects).

The ink flow rates that were measured are in the same order of magnitude as a conventional ballpoint pen.

The oligomer resins are slightly hygroscopic and all take less than 4% of water after six months of aging at 40° C. and 80% relative humidity.

The viscosity of the inks stabilizes after one month of aging at 40° C. and 80% relative humidity.

The crosslinked inks are indelible and resistant to the solvents tested.

The best results were obtained with formula No. 1.

Formula No. 2 is slightly more subject to drying in the body of the pen and thus has writing performance levels that are not quite as good as formula No. 1.

Formula No. 3 has a slightly worse resistance to the solvents than formula No. 1 and formula No. 2.

Formulas Nos. 4, 5 and 6 have a slightly worse resistance to the solvents than formulas Nos. 1 and 2 and the inks are also subject to drying.

The invention claimed is:

1. A solvent-free photocrosslinkable writing ink comprising, as percentage by weight relative to the total weight of the ink:
   a—between at least 40% and 75% of a photocrosslinkable acrylate oligomer and/or photocrosslinkable methacrylate oligomer;
   b—between 1% and no more than 55% of a photocrosslinkable acrylate monomer and/or photocrosslinkable methacrylate monomer;
   c—between 0.5% and 6% of a photoinitiator;
   d—between 1% and 10% of a dye, wherein the dye is dissolved in the photocrosslinkable acrylate oligomer and/or photocrosslinkable methacrylate oligomer and the photocrosslinkable acrylate monomer and/or photocrosslinkable methacrylate monomer, and
   e—between 0 and 10% of an additive.

2. The ink as claimed in claim 1, wherein the ink is intended for a ballpoint pen.

3. The ink as claimed in claim 1, wherein the photocrosslinkable acrylate oligomer and/or photocrosslinkable methacrylate oligomer is selected from the group consisting of aliphatic polyurethane acrylates, aromatic polyurethane acrylates, polyester acrylates, polyether acrylates, polyepoxy acrylates, aliphatic polyurethane methacrylates, aromatic polyurethane methacrylates, polyester methacrylates, polyether methacrylates, polyepoxy methacrylates, and mixtures thereof.

4. The ink as claimed in claim 1, wherein the photocrosslinkable acrylate monomer and/or photocrosslinkable methacrylate monomer is selected from the group consisting of monofunctionalized acrylates, monofunctionalized methacrylates, and mixtures thereof.

5. The ink as claimed in claim 1, wherein the photoinitiator is of type I.

6. The ink as claimed in claim 1, wherein the additive is present and selected from the group consisting of a photosensitizer, a crosslinking accelerator, a lubricant, an initiator additive, an anticorrosion agent, a biocide, a neutralizing agent, a humectant, an anti-drying agent, a resin, a binder, a thickener, a rheology agent, a surfactant, and mixtures thereof.

7. The ink as claimed in claim 1, comprising, as percentage by weight relative to the total weight of the ink:
   a—between 41% and 73% of the photocrosslinkable acrylate oligomer and/or photocrosslinkable methacrylate oligomer;
   b—between 10% and 50% of the photocrosslinkable acrylate monomer and/or photocrosslinkable methacrylate monomer;
   c—between 4% and 6% of the photoinitiator;
   d—between 3% and 5% of the dye, wherein the dye is dissolved in the photocrosslinkable acrylate oligomer and/or photocrosslinkable methacrylate oligomer and the photocrosslinkable acrylate monomer and/or photocrosslinkable methacrylate monomer, and
   e—between 0 and 10% of the additive.

8. The ink as claimed in claim 1, wherein the dye is a basic dye.

9. The ink as claimed in claim 1, wherein the photocrosslinkable acrylate oligomer and/or photocrosslinkable methacrylate oligomer is selected from the group consisting of aromatic polyurethane acrylates, polyester acrylates, aliphatic polyurethane acrylates, and mixtures thereof.

10. The ink as claimed in claim 1, wherein the photocrosslinkable acrylate monomer and/or photocrosslinkable methacrylate monomer is selected from the group consisting of polyfunctionalized acrylates, polyfunctionalized methacrylates, and mixtures thereof.

11. A process for making a writing medium secure, comprising the following successive steps:
    A. application of the photocrosslinkable ink as claimed in claim 1 to a writing medium;
    B. irradiation of the ink applied by means of a UV or visible irradiation source so as to dry the ink and to bring about crosslinking of the photocrosslinkable acrylate oligomer and/or photocrosslinkable methacrylate oligomer.

12. The process as claimed in claim 11, wherein step A is carried out with a writing pen which is a ballpoint pen with a flow rate of between 10 and 300 mg/200 m of writing.

13. The process as claimed in claim 11, wherein the writing medium is a paper or cardboard medium.

14. A crosslinked ink obtained by crosslinking the photocrosslinkable ink as claimed in claim 1.

15. The crosslinked ink as claimed in claim 14, wherein the crosslinked ink withstands solvents selected from the group consisting of dimethylformamide, ethanol, acetone, benzyl alcohol, and mixtures thereof.

16. A pen for a photocrosslinkable ink comprising the photocrosslinkable ink as claimed in claim 1.

17. The pen as claimed in claim 16, further comprising a UV or visible irradiation source.

18. The pen as claimed in claim 17, wherein the UV or visible irradiation source emits a monodisperse or polydisperse wavelength chosen from the range of between 232 and 410 nm.

19. The pen as claimed in claim 16, wherein the pen is a ballpoint pen.

20. The pen as claimed in claim 19, wherein the pen has a flow rate of between 10 and 300 mg/200 m of writing.

* * * * *